(12) United States Patent
Novins

(10) Patent No.: US 8,973,936 B1
(45) Date of Patent: Mar. 10, 2015

(54) REHABILITATION DEVICE

(71) Applicant: Scott Novins, Bakersfield, CA (US)

(72) Inventor: Scott Novins, Bakersfield, CA (US)

( * ) Notice: Subject to any disclaimer, the term of this patent is extended or adjusted under 35 U.S.C. 154(b) by 0 days.

(21) Appl. No.: 14/155,181

(22) Filed: Jan. 14, 2014

(51) Int. Cl.
  *B62M 1/30* (2013.01)
  *B62M 1/28* (2013.01)
  *B62M 1/26* (2013.01)

(52) U.S. Cl.
  CPC .. *B62M 1/28* (2013.01); *B62M 1/26* (2013.01)
  USPC ............ 280/252; 280/253; 280/255; 180/245

(58) Field of Classification Search
  CPC ............. B62M 1/28; B62M 1/26; B62M 1/24
  USPC ............... 175/45; 280/252, 253, 255
  See application file for complete search history.

(56) References Cited

U.S. PATENT DOCUMENTS

| | | | |
|---|---|---|---|
| 1,276,587 A * | 8/1918 | Spaulding | 280/251 |
| 2,118,640 A * | 5/1938 | Bergen | 280/221 |
| 2,578,828 A | 12/1951 | Nelson | |
| 2,626,600 A | 1/1953 | McMennamy | |
| 2,629,371 A | 2/1953 | Kocian et al. | |
| 3,269,768 A | 8/1966 | Kinney | |
| 3,937,519 A | 2/1976 | Schoolden | |
| 4,068,857 A | 1/1978 | Karlsson | |
| 4,421,336 A | 12/1983 | Petrofsky et al. | |
| 4,523,769 A | 6/1985 | Glaser et al. | |
| 4,880,249 A * | 11/1989 | Gray et al. | 280/253 |
| 5,368,321 A * | 11/1994 | Berman et al. | 280/221 |
| 5,848,955 A | 12/1998 | Gooch et al. | |
| 6,010,433 A * | 1/2000 | Chao | 482/57 |
| 6,402,173 B1 * | 6/2002 | Chiu | 280/252 |
| 6,540,648 B1 * | 4/2003 | Chao | 482/57 |
| 8,517,405 B2 * | 8/2013 | Yan | 280/252 |
| 8,540,264 B1 * | 9/2013 | Schlangen | 280/221 |
| 2003/0193160 A1 * | 10/2003 | Mehmet | 280/255 |
| 2007/0173380 A1 | 7/2007 | Gabel et al. | |
| 2009/0315294 A1 * | 12/2009 | Conti | 280/221 |
| 2010/0320716 A1 * | 12/2010 | Sung | 280/210 |
| 2013/0200590 A1 * | 8/2013 | Kim | 280/257 |

FOREIGN PATENT DOCUMENTS

| | | |
|---|---|---|
| EP | 354555 A2 | 2/1990 |
| WO | 9728775 A1 | 8/1997 |

* cited by examiner

*Primary Examiner* — Kevin Hurley
*Assistant Examiner* — Michael Stabley
(74) *Attorney, Agent, or Firm* — R. Scott Kimsey, Esq.; Klein DeNatale Goldner

(57) ABSTRACT

A rehabilitation device includes a wheeled platform with first and second pedals, the first and second pedals engaging drive mechanisms for first and second rear wheels of the device, respectively. First and second braking mechanisms provide independent braking of the first and second rear wheels of the device. The independent braking mechanisms of the rehabilitation device provide a method of steering the device.

1 Claim, 3 Drawing Sheets

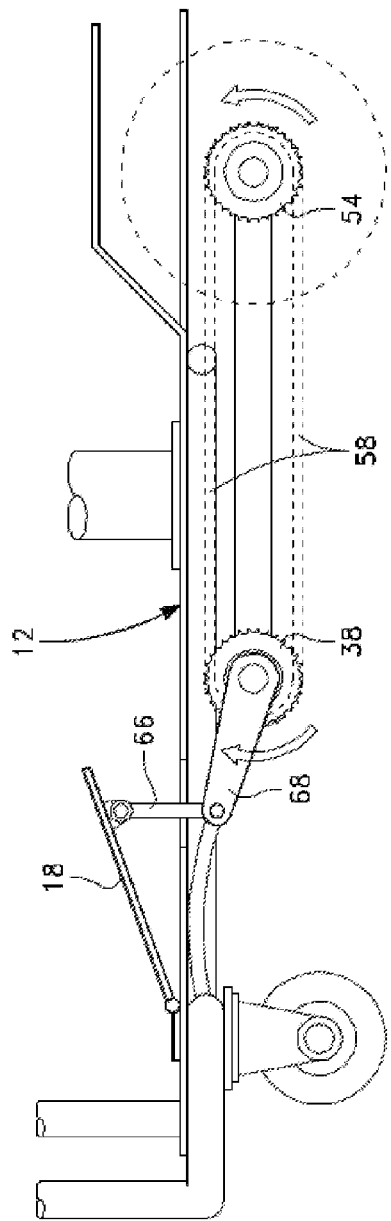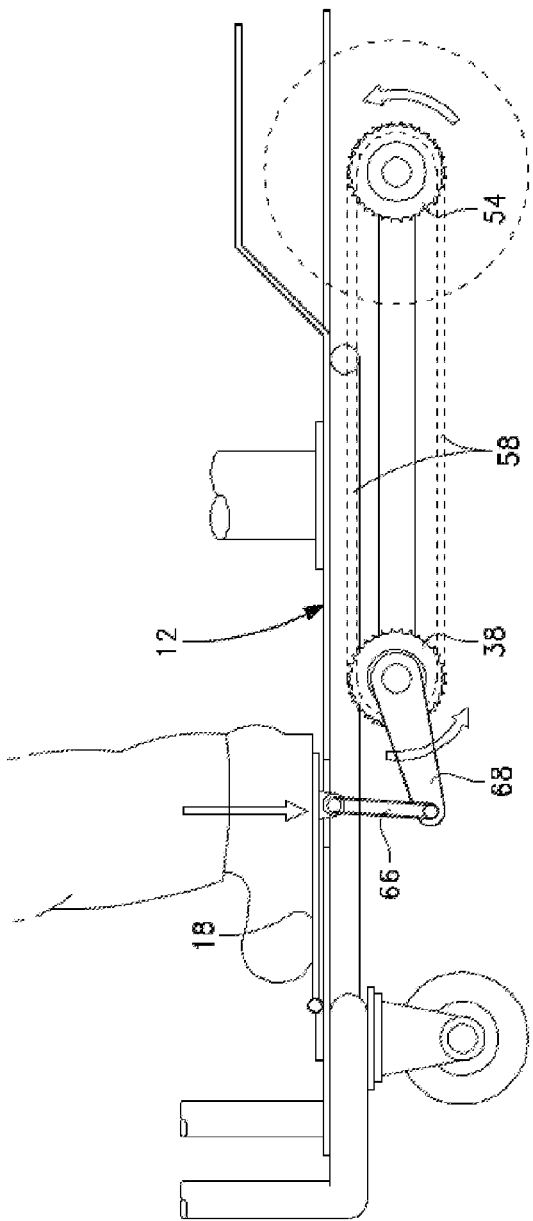

REHABILITATION DEVICE

RELATED APPLICATIONS

Not applicable.

BACKGROUND OF THE INVENTION

1. Field of the Invention

The present invention relates generally to a rehabilitation device, and more specifically to a wheeled rehabilitation device with independent drive and braking mechanisms.

2. Background of the Invention

A variety of rehabilitation devices are known in the art. Some such devices assist a user in walking under his own power, while others provide fully automated transportation for a user in need. Manual devices, such as a walker, provide limited flexibility as the needs of a user change, or as multiple users with different needs utilize the device. Fully automated devices are of limited use in rehabilitation efforts, as the device does not allow a user to utilize much of his own power, or allow the user to progress to different levels of active engagement with the device as rehabilitation proceeds. Devices with steering mechanisms often require a specific range of rotational motion on the part of the user in order to steer the device.

SUMMARY OF THE INVENTION

A rehabilitation device includes a platform with a front edge, a rear edge, first and second opposing side edges, and an upper and lower surface. A first front wheel is attached to the lower surface of the platform near where the front edge and first opposing side edge meet. A second front wheel is attached to the lower surface of the platform near where the front edge and the second opposing side edge meet. A first rear wheel is attached to the lower surface of the platform near where the rear edge and the first opposing side edge meet. A second rear wheel is attached to the lower surface of the platform near where the rear edge and second opposing side edge meet. A first pedal extends upwardly from the upper surface of the platform. The first pedal is operatively engaged with the first rear wheel and operation of the first pedal causes rotation of the first and second rear wheels, propelling the device forward. A second pedal extends upwardly from the upper surface of the platform. The second pedal is operatively engaged with the second rear wheel and operation of the second pedal causes rotation of the first and second wheels, propelling the device forward. The first and second rear wheels are rotationally independent of one another. A first braking mechanism is in operative engagement with the first rear wheel so that operation of the first braking mechanism slows the rotation of the first rear wheel. A second braking mechanism is in operative engagement with the second rear wheel so that operation of the second braking mechanism slows the rotation of the second rear wheel.

The rehabilitation device may include a seat extending upwardly from the upper surface of the platform behind the first and second pedals.

The rehabilitation device may further include a chain drive coupled to one of the first and second rear wheels, the chain drive being actuated by operation of at least one of the pedals. Actuation of the chain drive causes rotation of the first and second rear wheels, propelling the rehabilitation device forward.

The rehabilitation device may include a second chain drive, with the first chain drive being coupled to the first pedal and first rear wheel, and the second chain drive being couple to the second pedal and the second rear wheel. Operation of the first pedal causes actuation of the first chain drive, and operation of the second pedal causes actuation of the second chain drive. Actuation of either chain drive causes rotation of both first and second rear wheels and propels the rehabilitation device forward.

The rehabilitation device may further include a first handle extending from the upper surface of the platform, the first braking mechanism attached to the first handle. The first braking mechanism may include a first brake control lever adjacent the first handle, a first brake, and a first brake cable extending between the first brake control lever and the first brake. A second handle may extend from the upper surface of the platform, the second braking mechanism attached to the second handle. The second braking mechanism may include a second brake control lever adjacent the second handle, a second brake, and a second brake cable extending between the second brake control lever and the second brake. Actuation of the first brake control lever causes the first brake to engage the first rear wheel, and actuation of the second brake control lever causes the second brake to engage the second rear wheel.

The rehabilitation device may include a first support bar having a horizontal portion and first and second opposing vertical portions, the first and second vertical portions extending downward from the horizontal portion and attaching to the platform.

The rehabilitation device may further include a forward support bar extending between the first and second opposing vertical portions of the first support bar below the level of the horizontal portion.

The rehabilitation device may also include a platform having an upper surface, lower surface, front edge, and opposing rear edge, at least one front wheel attached to the lower surface of the platform between the middle and front of the platform, and first and second rear wheels attached to the lower surface of the platform between the middle and rear of the platform. First and second pedals may be operatively engaged with any of the front wheel or first and second rear wheels, so that actuation of either pedal causes forward rotation of the wheel. The rehabilitation device may include a first brake selectively engageable with the first rear wheel and a second brake selectively engageable with the second rear wheel, such that engagement of either brake causes a slow down in the rotation of the respective wheel, thereby steering the rehabilitation device in one direction or the other.

BRIEF DESCRIPTION OF THE DRAWINGS

FIG. 3 is a side view of one embodiment of a rehabilitation device showing the first pedal thereof in a raised position.

FIG. 4 is a side view of one embodiment of a rehabilitation device show the first pedal thereof in a depressed position.

DETAILED DESCRIPTION OF THE INVENTION

Figure 1:
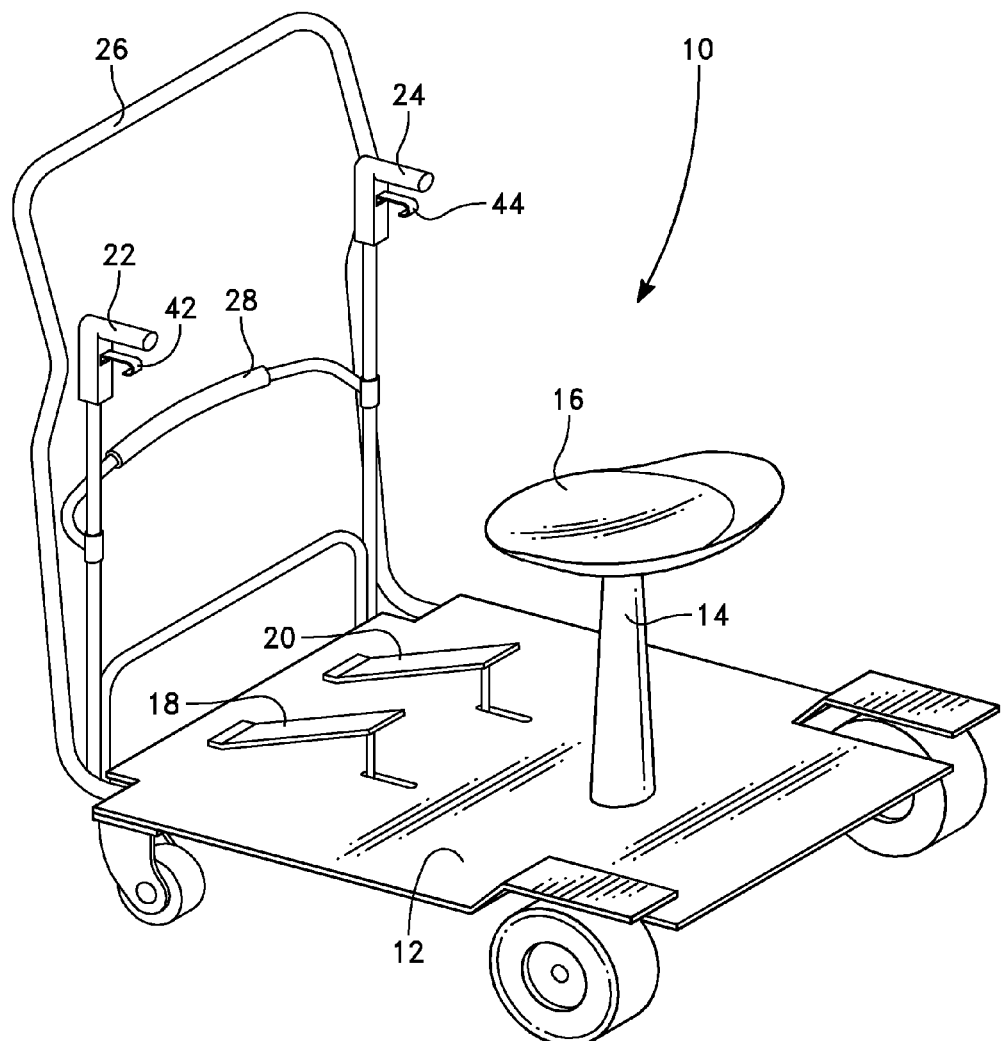
FIG. 1 is a side perspective view of an embodiment of the present rehabilitation device.

Turning to the drawings, wherein like numerals indicate like parts, the numeral 10 refers to one embodiment of a rehabilitation device of the present invention. Device 10 includes generally a platform 12, seat 16, pedals 18 and 20, and brake controls 42 and 44, as well as the structural elements described below.

Platform 12 of rehabilitation device 10 provides a firm, solid support on which a user of the present invention may stand, or on which the user's feet may be placed when the user is sitting. Extending vertically from platform 12 is a shaft 14 supporting seat 16. Seat 16 may be attached to shaft 14 in a fixed position, or may be rotatably attached thereto such that the user of rehabilitation device 10 may easily adjust the orientation of seat 16 for ease of getting on or off the device, or for accessing objects near the device.

Also fixed to platform 12 are first pedal 18 and second pedal 20, operably engaged with the chain drives of rehabilitation device 10, described more fully below. First pedal 18 and second pedal 20 are preferably angled such that the tops of the pedals are oriented toward the front of rehabilitation device 10. Pedals 18 and 20 are operable from a standing position, or when a user is seated on seat 16.

When a user utilizes rehabilitation device 10, the user may grip first handle 22 and second handle 24 with his hands, providing a stable support for the user, particularly when the user is in a standing position. First handle 22 and second handle 24 each include a brake control lever (first brake control lever 42 and second brake control lever 44, respectively) in close proximity thereto. This allows the user of rehabilitation device 10 to easily slow the device, and also to steer it as described further below.

Also shown in FIG. 1 are platform 12, seat stand 14, seat 16, first pedal 18, second pedal 20, first handle 22, second handle 24, first brake control lever 42, and second brake control lever 44, all described above.

Upper bar 26, extends across the front width of device 10 at a height greater than that of first and second handles 22 and 24. In one embodiment of device 10, upper bar 26 includes a horizontal portion extending across the width of the front of device 10, and two vertical portions, one at each end of the horizontal portion. The vertical portions extend downward from the horizontal portion and attach to platform 12. The engagement between upper bar 26 and platform 12 is firm, so that upper bar 26 provides a solid support upon which a user may lean, or which a user may use to pull himself from seat 16 into a standing position. Upper bar 26 may be provided in any suitable size or shape, or attached to platform 12 in any suitable manner, such that upper bar 26 is capable of providing a firm support for use by a user of rehabilitation device 10.

Some embodiments of rehabilitation device 10 may include a front bar 28, also shown in FIG. 1. In the embodiment of device 10 shown in the figure, front bar 28 extends between the vertical portions of upper bar 26. Front bar 28 is preferably fixedly attached to front bar 26 to provide a firm support for use by a user of device 10, though it is contemplated that in some embodiments of device 10, front bar 28 may be adjustably attached to upper bar 26 such that the height of front bar 28 may be adjusted by raising or lowering its position along the vertical portions of upper bar 26. Front bar 28 extends outward, away from the front of rehabilitation device 10, where it is readily accessible by a user standing in front of device 10. Front bar 28 may be used, for example, to help a user of device 10 maneuver into position when getting on or off of device 10. Front bar 28 may also provide protection for rehabilitation device 10 if a user of device 10 inadvertently pedals or steers device 10 into an obstacle. Either of front bar 28 or upper bar 26 may be provided with a padded or cushioned portion or grip.

Figure 2:
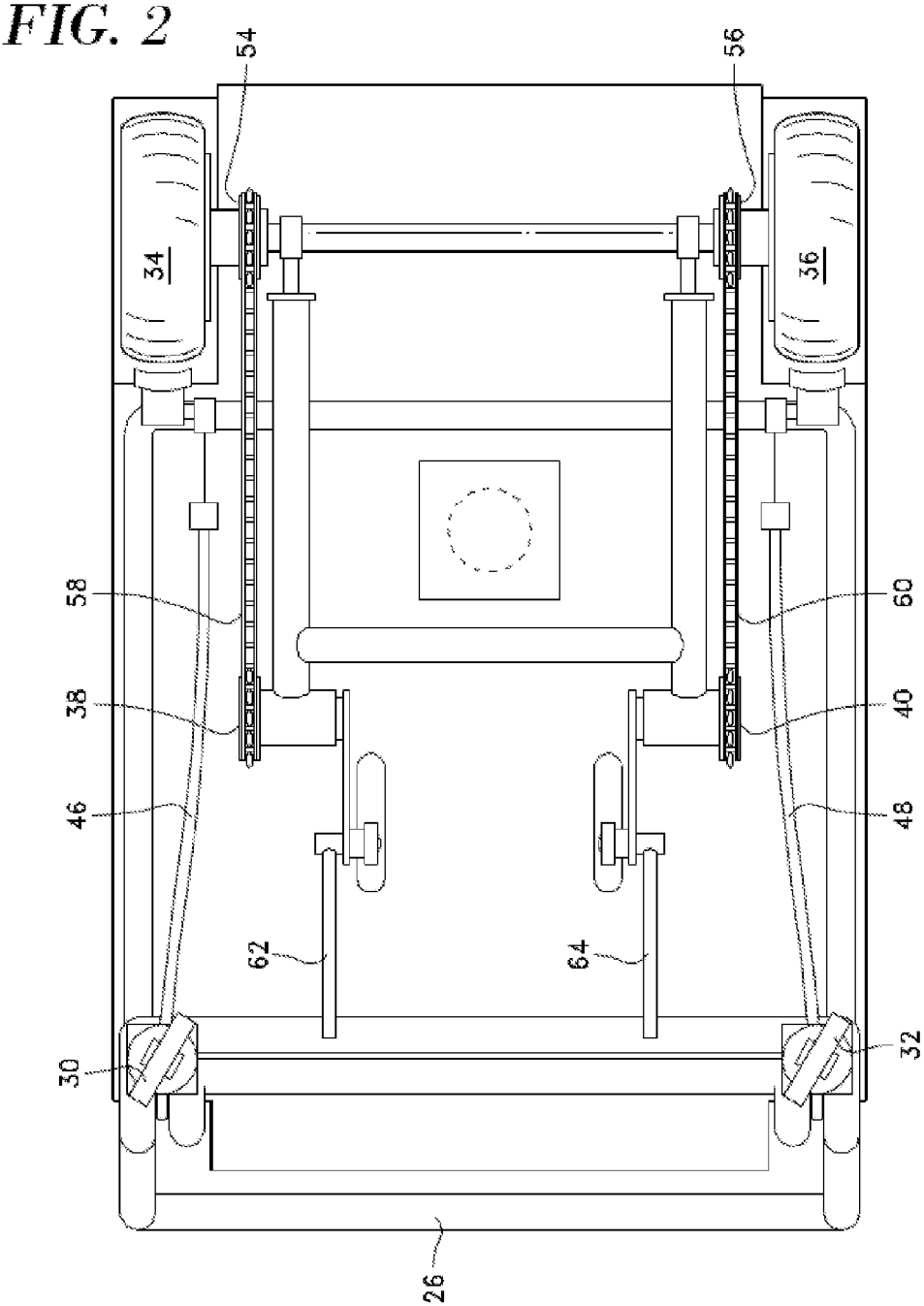
FIG. 2 is a bottom view of an embodiment of the present rehabilitation device.

First caster 30 and second caster 32 are also visible in FIG. 2, each provided at the front of rehabilitation device 10, at opposing ends of the front, lower edge of platform 12. First caster 30 and second caster 32 support platform 12 on a surface on which rehabilitation device 10 is used, and also roll with the movement of device 10. Casters 30 and 32 are preferably fully-rotatable about their axes, each caster able to turn a full three-hundred sixty degrees in rotation. The full range of rotation offered by casters 30 and 32 provides for ease of steering of device 10 by a user thereof, and also allows the user to turn device 10 at relatively tight angles. Although the embodiment of device 10 shown in the figures utilizes first and second casters 30 and 32, it is contemplated that any type of wheeled structure may be used in place of the casters, including, for example, a pneumatic tire.

First rear wheel 34 is also shown in FIG. 2, affixed to the lower surface of the rear of platform 12. A second rear wheel 36 is also provided (seen, for example, in FIG. 2). In the embodiment of rehabilitation device 10 shown in the figures, first and second rear wheels 34 and 36 are not casters, but are pneumatic tires. In the embodiment of device 10 shown, first and second pedals 18 and 20 are used by a user to power first and second rear wheels 34 and 36 via chain drives associated with each wheel. The use of pneumatic tires for first and second rear wheels 34 and 36 provide greater surface area contacting the surface on which device 10 is being used, and allow for better performance of device then than would, for example, casters in the rear position. It is contemplated, however, that any suitable wheeled structure may be employed.

FIG. 2 provides a view of the underside of one embodiment of rehabilitation device 10, showing aspects of the drive and braking mechanisms thereof. First chain gear 38 and second chain gear 40 are shown, and these gears are operatively engaged with first pedal 18 and second pedal 20, respectively. Thus, when a user of device 10 operates first pedal 18, first chain gear 38 is caused to rotate. When a user operates second pedal 20, second chain gear 40 is caused to rotate. The rotation of first chain gear 38 is independent of the rotation of second chain gear 40, however either of first pedal 18 or second pedal 20 alone may be used to propel rehabilitation device 10 forward, as described below. Thus, a user unable to use one leg, or having a reduced ability to use one leg, due to injury or some other cause, is still able to propel rehabilitation device 10 forward along a straight path. When first pedal 18 is no depressed, return spring 62 biases first pedal 18 upward, readying the pedal for use. Likewise, when second pedal 20 is not depressed, second return spring 64 biases that pedal upward such that it is ready for use. Although return springs 62 and 64 are shown in the drawings, it is contemplated that any suitable mechanism, including but not limited to a piston, may be used for this purpose.

Rehabilitation device 10 also includes third chain gear 54 and fourth chain gear 56 (the latter of which is visible in FIG. 3). Third chain gear 54 is operatively engaged with first rear wheel 34, while fourth chain gear 56 is operatively engaged with second rear wheel 36. A first chain 58 links first chain gear 38 and third chain gear 54. A second chain 60 links second chain gear 40 and fourth chain gear 56. Each combination of chain and chain gears used in conjunction with the present device may be referred to as a chain drive. It should be understood that when a user operates first pedal 18, this causes a corresponding rotation of first chain gear 38. The rotational motion of first chain gear 38 is transferred to third chain gear 54 via first chain 58. The rotational motion of third chain gear 54 is transferred to first rear wheel 34, which is operatively engaged therewith, and the movement of first rear wheel 34 upon the surface on which rehabilitation device 10 is being utilized propels the device. Operation of second pedal 20 causes a similar sequence of events involving second chain gear 40, second chain 60, fourth chain gear 56, and second rear wheel 36. Although the two chain drives utilized in the embodiment of device 10 shown are not connected, operation of only one of pedals 18 or 20 will still propel rehabilitation device 10 in a forward direction.

Each of first and second rear wheels 34 and 36 utilize independent clutch mechanisms. When first pedal 18 is not actuated, and is in the upright position (shown, for example, in FIG. 3), first rear wheel 34 is disengaged from its respective chain drive mechanism, allowing the wheel to move freely and independently of the chain drive. Likewise, when second pedal 20 is disengaged and in the upright position, second rear wheel 36 is disengaged from its respective chain drive mechanism and able to rotate freely. Thus, as noted above, when only one of pedals 18 or 20 is actuated, both rear wheels 34 and 36 rotate in a forward direction. When either of pedals 18 or 20 is not actuated, the disengagement of the respective wheel from its chain drive mechanism allows independent braking of that wheel. Braking of one wheel alone allows steering of rehabilitation device 10.

FIG. 2 also depicts elements of the braking system of rehabilitation device 10. As noted above, first brake control lever 42 and second brake control lever 44 are readily accessible to a user of device 10, whether the user is standing or seated. When the user squeezes first brake control lever 42 or second brake control lever 44, the mechanical force is transmitted to the braking mechanism of device 10. In the embodiment of device 10 shown, Bowden cables are used, such as are commonly used in bicycle brakes. First brake cable 46 is engaged with first brake control 44, and second brake cable 48 is engaged with second brake control lever 44. The opposing end of first brake cable 46 engages a first brake 50, while the opposing end of second brake cable 48 engages second brake 52. In the embodiment of device 10 shown in the drawings, first brake 50 and second brake 52 are paddle mechanisms that physically engage first rear wheel 34 and second rear wheel 36, respectively. When a user squeezes first brake control lever 42, mechanical force is transmitted by first brake cable 46 to first brake 50, causing first brake 50 to engage first rear wheel 34, tending to slow the rotational motion thereof. A similar sequence of events occurs when a user squeezes second brake control lever 44, though the mechanical force is transmitted along second brake cable 48 to second rear wheel 36. It will be understood, based on the description above, that a user may steer device 10 by engaging only one of the two brake controls, thereby tending to slow the rotational motion of only one of the rear wheels 36 and 36. Although the embodiment of device 10 shown in the drawings utilizes brake cables to transmit motion from the brake controls to the brakes, it is contemplated that any suitable mechanism, including the use of hydraulic hoses, rods, or the like, may be provided for slowing and/or steering device 10. In addition to the paddle-style brakes described above and shown in the drawings, any suitable brake may be used with the present device.

FIGS. 3 and 4 also show linkages between the first pedal 18 and the corresponding chain drive mechanism of rehabilitation device 10. A first linkage 66 is attached to first pedal 18 and to a second linkage 68. Second linkage 68 is also attached to first chain gear 38. Thus, depressing first pedal 18 downward causes a corresponding rotation of first chain gear 38. FIG. 4 shows pedal 18 in the depressed position. Second pedal 20 has a corresponding mechanism, not visible in FIGS. 3 and 4. It is to be understood that the mechanism of translating downward motion of the pedals into rotation motion of the chain gears may be accomplished in any suitable manner, and is not limited to the system of linkages shown in the figures and described herein.

Rehabilitation device 10 provides a number of advantages to a user in terms of ease of use and efficacy in assisting in the rehabilitation of the user. The presence of seat 16, as well as platform 12, allows a user to use device 10 from either a sitting or standing position, thereby allowing device 10 to be used by individuals with varying degrees of strength in their legs, and allows them to continue to use the device as leg strength improves, adapting the way in which they use device 10 to further the rehabilitation process. The presence of handles, upper bar 26, and front bar 28 provide a variety of solid surfaces for a user to hold while using device 10, or while getting on and off of device 10. Brakes controls 42 and 44 provide an easy braking mechanism, whereby a user already holding onto handles 22 and 24 need only extend his fingers downward to grasp the brake controls, then squeeze to engage the controls. The fact that the braking mechanism also allows for steering of the device provides an advantage for users who may have limited range of rotational motion, or limited stability, who might find turning a wheel or other mechanism to steer device 10 difficult or destabilizing.

It is contemplated that some embodiments of the present device are constructed with dimensions that allow use of the device in a conventional home, with maneuverability through standard-sized doorways, without modifications to the structure to accommodate rehabilitation device 10. Thus, a user of the device can use rehabilitation device 10 for mobility and rehabilitation within a home or other structure. This provides an advantage over motorized wheel chairs, carts, or other devices that are not readily usable within a conventional structure without modification of the structure to allow passage or maneuverability of the device.

The embodiment of the present rehabilitation device shown in the figures is designed to have a one-to-one ration of vertical motion (operation of the pedals) to linear distance. It is contemplated, however, that other ratios may be employed. Additional gears other than those shown in the drawings, for example, may be used in some embodiments of the present rehabilitation device. It is further contemplated that some or all such gears may be disposed in a plane parallel to that of platform 12 in order to allow for the use of additional gears without extending the gears or drive mechanism downward so far that the rehabilitation device has difficulty with ground clearance.

Although chain drive mechanisms are shown in the drawings and described above, it is contemplated that any suitable drive mechanism may be used with the present rehabilitation device. Such suitable drive mechanisms may include a battery-powered electric backup that can be selectively engaged by the use of the rehabilitation device when necessary or desired. For example, a user of the present rehabilitation device may find that having reached a desired location, or en route thereto, he can no longer continue due to reasons of health, fatigue, and the like. In such a situation, the user may be stranded, unable to return to a bed, chair, or other resting place. In such situations, the user may engage a backup electric motor powered by an on-board battery, and may user this backup motor to move to the bed, chair, or other desired location. The user may resume manual operation of the device once he is able. Any suitable backup drive mechanism may be used with the present device.

In some embodiments of the present rehabilitation device, either or both of the front and rear wheel pairs may be pneumatic wheels. Pneumatic wheels may help prevent slipping on various surfaces and also allow the device to travel over terrain that is not smooth enough for other wheels. It is contemplated, however, that in other embodiments of the present rehabilitation device, either or both of the front and rear wheel pairs may be hard, non-pneumatic wheels. The use of hard wheels allows the device to be propelled more easily, particularly over some surfaces such as thick carpeting.

It is contemplated that the various embodiments of the present rehabilitation device shown and described above are exemplary, and are not intended to be limiting. Various modifications to the present device will be readily apparent to those of skill in the art upon reading this disclosure, and such modifications are considered to be within the spirit and scope of the present invention.

Having thus described the preferred embodiment of the invention, what is claimed as new and desired to be protected by Letters Patent includes the following:

1. A rehabilitation device comprising:
    a platform comprising an upper surface, a lower surface, a front edge, a rear edge, and first and second opposing side edges;
    a first front wheel attached to the lower surface of the platform near the intersection of the front edge and first opposing side edge thereof;
    a second front wheel attached to the lower surface of the platform near the intersection of the front edge and the second opposing side edge thereof;
    a first rear wheel attached to the lower surface of the platform near the intersection of the rear edge and the first opposing side edge thereof;
    a second rear wheel attached to the lower surface of the platform near the intersection of the rear edge and the first opposing side edge thereof, the second rear wheel being rotationally independent of the first rear wheel;
    a first pedal extending upwardly from the upper surface of the platform, the first pedal in operative engagement with the first rear wheel such that operation of the first pedal causes a corresponding rotation of the first and second rear wheels;
    a second pedal extending upwardly from the upper surface of the platform, the second pedal in operative engagement with the second rear wheel such that operation of the second pedal causes a corresponding rotation of the first and second rear wheels;
    a first braking mechanism in operative engagement with the first rear wheel, such that operation of the first braking mechanism causes slowing of the rotation of the first rear wheel;
    a second braking mechanism in operative engagement with the second rear wheel, such that operation of the second braking mechanism causes slowing of the rotation of the second rear wheel;
    a first handle extending from the upper surface of said platform, the first braking mechanism attached to the first handle and comprising:
        a first brake control lever disposed adjacent said first handle;
        a first brake; and
        a first brake cable extending between the first brake control and the first brake;
    and a second handle extending from the upper surface of said platform, the second braking mechanism attached to the second handle and comprising:
        a second brake control lever disposed adjacent said second handle;
        a second brake; and
        a second brake cable extending between the second brake control lever and the second brake,
    wherein actuation of said first brake control causes said first brake to engage said first rear wheel, and actuation of said second brake control causes said second brake to engage said second rear wheel.

* * * * *